(12) United States Patent
Kamitani et al.

(10) Patent No.: US 6,465,108 B1
(45) Date of Patent: Oct. 15, 2002

(54) PROCESS FOR THE PRODUCTION OF ARTICLES COVERED WITH SILICA-BASE COATS

(75) Inventors: Kazutaka Kamitani; Toyoyuki Teranishi; Kazuhiro Doushita; Takashi Sunada; Hiroaki Kobayashi; Hiroaki Yamamoto; Hisashi Ogawa, all of Osaka-fu (JP)

(73) Assignee: Nippon Sheet Glass Co., Ltd., Osaka-Fu (JP)

( * ) Notice: Subject to any disclaimer, the term of this patent is extended or adjusted under 35 U.S.C. 154(b) by 0 days.

(21) Appl. No.: 09/360,279

(22) Filed: Jul. 26, 1999

(51) Int. Cl.$^7$ ............................. B32B 9/04; B32B 17/06; B05D 3/02
(52) U.S. Cl. ..................... 428/448; 428/446; 428/447; 428/428; 428/429; 427/387; 427/164; 427/165; 106/287.16
(58) Field of Search ................................. 428/447, 448, 428/428, 429, 446; 427/387, 164–169; 106/287.1, 287.16

(56) References Cited

U.S. PATENT DOCUMENTS

| 5,328,768 A | | 7/1994 | Goodwin ................... 428/428 |
| 6,033,738 A | * | 3/2000 | Teranishi .................... 427/387 |
| 6,156,409 A | * | 12/2000 | Doushita et al. ............ 428/143 |

FOREIGN PATENT DOCUMENTS

| FR | 94 03249 | 6/1996 |
| JP | 59-195504 | 11/1984 |
| JP | 2-311332 | 12/1990 |
| JP | 5-86353 | 4/1993 |
| JP | 6-41761 | 2/1994 |
| JP | 6-53647 | 2/1994 |
| JP | 9-132433 | 5/1997 |
| JP | 9-142888 | 6/1997 |

OTHER PUBLICATIONS

International Search report dated Feb. 9, 1999.

* cited by examiner

Primary Examiner—Robert Dawson
Assistant Examiner—Michael J Feely
(74) Attorney, Agent, or Firm—Dike, Bronstein, Roberts & Cushman Intellectual Prop.

(57) ABSTRACT

Coating liquid prepared by dissolving an acid and a silicon alkoxide into alcohol, containing at least one of either a silicon alkoxide or a hydrolyzate thereof (including a partial hydrolyzate) in an amount of 0.010 to 3% by weight (in terms of silica), an acid in terms of 0.0010 to 1.0 normality, and water in terms of 0 to 10% by weight is coated on a substrate to produce an article coated with a silica-based film. By this method for producing a silica-based film coated article, an excellent silica-based film coated article can be obtained without requiring baking and pretreatment. Furthermore, a functional film coated article excellent in durability can be produced in a short period of time and safely by using the abovementioned silica-based film as a primer film and applying thereon an organosilane having a hydrolyzable group and a functional group having a specific function or a hydrolyzate thereof.

27 Claims, No Drawings

PROCESS FOR THE PRODUCTION OF ARTICLES COVERED WITH SILICA-BASE COATS

This application claims a right of priority to co-pending International Application No. PCT/JP98/05464, which was filed on Dec. 3, 1998, and which claimed a right of priority to co-pending Japanese Application H9(97)-334160, which was filed on Dec. 4, 1997.

TECHNICAL FIELD

The present invention related to a method for producing an article comprising a substrate such as ceramics, plastics, metals or the like supporting thereon a silica-based film coated article, a silica-based film-coated article, a liquid composition for silica-based film coating, a method for producing an article comprising the silica-based film supporting thereon a functional film coated, and a functional film-coated article.

BACKGROUND ART

There are known various technologies in which a silica primer film or other oxide primer films are provided between a substrate and a functional film in forming a functional film on the surface of the substrate such as glass or other material, for the purpose of improving bonding strength between the substrate and the functional film, and preventing diffusion of an alkali component and improving durability of the functional film when the substrate contains an alkali component.

As methods for providing this oxide primer film, there are known sol-gel methods (Japanese Patent Publication No. 20781 of 1992, Japanese Laid-Open Patent No.311332 of 1990), methods in which a solution prepared by dissolving chlorosilane in a non-aqueous solvent is applied (Japanese Laid-Open Patent No. 86353 of 1993, Japanese Patent No. 2525536 (Japanese Laid-Open Patent No.238781 of 1993)), CVD methods, vapor deposition methods and the like.

In these methods, the main point thereof is the increase in the number of hydroxyl groups on the surface of the primer film for improving bonding strength with the functional film. However, there have been problems in that the hydroxyl group on the surface of the primer film tends to adsorb water contained in air, if water is once adsorbed, it is difficult to remove it with any ease, so heating is necessary at about 100 to 200° C. in applying the functional film (the abovementioned Japanese Patent Publication No.20781 of 1992, Japanese Laid-Open Patent No. 311332 of 1990, Japanese Laid-Open Patent No. 238781 of 1993) or treatment for a long period of time is necessary even when heating is not necessary (the abovementioned Japanese Laid-Open Patent No. 86353 of 1993).

In the methods in which the oxide primer film is formed (the abovementioned Japanese Laid-Open Patent No. 311332 of 1990, Japanese Patent No. 2525536), strength of the primer film itself is low by only applications at normal temperatures, therefore, baking at a temperature of about 500 to 600° C. after the application is indispensable when increasing strength. Furthermore, when the substrate contains an alkali, it is necessary to form an oxide primer film having a thickness of 100 nm or more for preventing diffusion of the alkali during the baking. However, there have been problems in that when the thickness of the primer film increases, the film thickness tends to become uneven, appearance failures such as reflection unevenness and the like tend to occur, production cost increases, and the like.

Furthermore, in the method in which a solution prepared by dissolving tetrachlorosilane into a non-aqueous solvent such as perfluorocarbon, methylene chloride and hydrocarbon is applied (the abovementioned Japanese Patent No. 2525536), scratch resistance is low though a silica primer film is obtained at normal temperatures. A chlorosilyl group has extremely high reactivity, and in the case of a coating solution, it is necessary to conduct the coating under an environment containing no storage water, whereby the production cost is consequently undesirable.

An object of the present invention is to solve the abovementioned problems of the prior art and to provide a method for producing in a short period of time and with ease a silica-based film-coated article excellent as a primer film and a functional film-coated article excellent in durability without requiring treatment leading to an increase in production costs such as baking and the like.

DISCLOSURE OF INVENTION

In the present invention, a silica-based film which is durable and has an alkoxyl group on the surface is coated on the surface of a substrate by applying on the substrate an alcohol solution composed of a silicon alkoxide in low concentration and a volatile acid in high concentration and drying at a normal temperature, and a functional film is allowed to be bonded to the substrate securely by applying on this silica-based film an organosilane having a hydrolyzable group and a functional group having a specific function, for solving the abovementioned problems.

Namely, the present invention is a method for producing a silica-based film-coated article by applying on a substrate a coating liquid composed of an alcohol solution containing a silicon alkoxide and an acid, wherein said coating liquid comprises;

(A) silicon alkoxides having at least two alkoxide groups or hydrolyzates thereof (including a partial hydrolyzate), 0.010 to 3% by weight (in terms of silica)

(B) an acid 0.0010 to 1.0 normality, and (C) water 0 to 10% by weight.

The phrase "in terms of silica," as used herein, is understood to mean that the Si content is calculated as $SiO_2$ as if all the Si contained in silicon alkoxide were to be converted to $SiO_2$.

The contents of the component (A) of 0.010 to 3% by weight (in terms of silica) is applicable when a silicon alkoxide and a hydrolyzate thereof are used alone, respectively, and also when they are mixed for use.

In the present invention, the silicon alkoxide used in the abovementioned coating liquid is not particularly restricted, and examples thereof include tetramethoxysilane, tetraethoxysilane, tetrapropoxysilane, tetrabutoxysilane and the like, and preferably, silicon alkoxides having relatively low molecular weight, for example, tetraalkoxysilanes having an alkoxyl group with 3 or less carbon atoms is used since they tend to form a compact film. Furthermore, polymers of these tetraalkoxisilanes having an average polymerization degree of 5 or less are preferably used.

As the acid catalyst used in the abovementioned coating liquid, volatile acids such as hydrochloric acid, hydrofluoric acid, nitric acid, acetic acid, formic acid, trifluoroacetic acid and the like are preferable since they vaporize and do not remain in the film by drying at normal temperatures, and among them, hydrochloric acid which has high volatility and of which handling is relatively easy is particularly preferable.

Furthermore, the alcohol solvent used in the abovementioned coating liquid is not particularly restricted, and examples thereof include methanol, ethanol, 1-propanol, 2-propanol, butyl alcohol, amyl alcohol and the like. Among them, linear saturated monohydric alcohol having 3 or less carbon atoms such as methanol, ethanol, 1-propanol, 2-propanol and the like is preferably used since evaporation speed thereof at normal temperatures is high.

In the coating liquid composed of an alcohol solution containing a silicon alkoxide, an acid and water (including that used for dissolution of the acid, that is generated from impurities in the solvent and from the atmosphere, and the like), hydrolysis reaction represented by the following formula (1) between a silicon alkoxide and water is carried out, during preparation, during storage and after application of the liquid. In the formula, R represents an alkyl group.

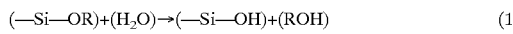

(1)

The hydrolyzed silanol groups (—Si—OH) mutually cause dehydration condensation reaction as shown in the following formula (2) to form a siloxane bond (—Si—O—Si—).

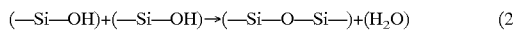

(2)

Whether or not the coating liquid composed of an alcohol solution containing a silicon alkoxide, an acid and water, the alkoxy group in the silicon alkoxide causes hydrolysis reaction as shown in the abovementioned formula (1), or whether the hydrolyzed groups (—Si—OH) mutually cause dehydration condensation reaction as shown in the abovementioned formula (2) in the abovementioned coating liquid or more depends significantly on the acid concentration of the solution, the concentration of the silicon alkoxide or the hydrolyzate thereof, and water content. When the concentration and water content of the silicon alkoxide are lower, the abovementioned reaction (1) does not easily occur and, consequently, the abovementioned reaction (2) also does not easily occur. When the acid concentration of the solution is within the pH range from 0 to 3, the abovementioned reaction (1) proceeds quickly, however, the abovementioned reaction (2) does not occur easily.

In the present invention, the degree of polymerization of the silicon alkoxide in the coating liquid is kept as low as possible before application by repressing the abovementioned dehydration condensation reaction, and when this coating liquid is applied on the surface of the substrate and dried, the abovementioned reactions (1) and (2) are allowed to occur suddenly to form a siloxane bond, and it is thus possible to form a compact film at normal temperatures.

If a silicon alkoxide is subjected to hydrolysis reaction and polycondensation reaction in a solution as in prior art, polymers mutually bond when the solution is applied on the surface of a substrate and dried, therefore, voids tend to be formed and a compact film is not formed, and curing by baking for obtaining a compact film is required. In the present invention, the silicon alkoxide in the coating liquid and hydrolyzate thereof (including a partial hydrolyzate) are preferably a monomer or a polymer of 20-mer or less. However, when the total amount of a monomer or a polymer of 2-mer or less is 80% by weight or more based on the total amount of the silicon alkoxide and hydrolyzate thereof (including a partial hydrolyzate), a polymer of over 20-mer can be contained without causing problems.

In the present invention, by keeping the concentration of the acid catalyst in the coating liquid at 0.0010 to 1.0 normality, pH of the coating liquid becomes 0 to 3, and particularly when pH is about 2, the hydrolysis reaction of the remaining alkoxyl group in the reaction formula (1) and dehydration condensation reaction in the reaction formula (2) do not easily occur in the coating liquid before application, and these reactions progress steeply directly after the coating liquid is applied. The preferable concentration of the acid in the coating liquid is from 0.01 to 1.0 normality.

It is preferable that the acid to be added as a catalyst has a high concentration of 0.3-fold or more of water content, to keep the concentration of the acid in the coating liquid. Namely, when an acid in the form of an aqueous solution is used, an acid of high concentration having a concentration of 23.1% or more, for example, an aqueous hydrochloric acid solution of about 6.3 normality or more is preferable. Furthermore, when an acid in the form of a solution dissolved in ethanol is added as a catalyst, if this ethanol solution contains water, for example in an amount of 0.5% by weight or more, it is preferable that the concentration of the acid in the ethanol solution is 0.15% by weight or more (0.3-fold of 0.5% by weight), for example, is 0.04 normality or more in the case of hydrochloric acid.

It is preferable that the concentration of at least one of either the silicon alkoxide in the coating liquid or hydrolyzate thereof (including a partial hydrolyzate) is as low as possible, since the hydrolysis reaction of the remaining alkoxyl group in the reaction formula (1) and the dehydration condensation reaction in the reaction formula (2) do not easily occur in the coating liquid before the application, which is also dependent on pH of the coating liquid. However, when this concentration is too low, the thickness of the silica film becomes too low, for example, becomes less than 5 nm, and uniform coating of the substrate becomes difficult, and when the substrate contains an alkali component, the ability to prevent diffusion of the alkali component tends to decrease and lower durability, and when a functional film is coated thereon, strong bonding of the functional film on the silica film becomes impossible. Furthermore, when the concentration of at least one of either the silicon alkoxide or the hydrolyzate (including a partial hydrolyzate) is over 3% by weight, the thickness of the resulting silica film exceeds 300 nm, and the resulting film tends to be scratched and is not strong. Therefore, the range of the concentration of at least one of either the silicon alkoxide in the coating liquid or the hydrolyzate (including a partial hydrolyzate)(including a polymer of less than 20-mer) is from 0.010 to 3% by weight, preferably from 0.010 to 0.6% by weight in terms of silica.

When the concentration of at least one of either the silicon alkoxide or the hydrolyzate (including a partial hydrolyzate) is kept relatively high, it is preferable to keep the concentration of the acid catalyst in the coating liquid relatively high. Specifically, it is preferable that the coating liquid contains (A) at least one of either the silicon alkoxide or the hydrolyzate (including a partial hydrolyzate) and (B) the acid, in a proportion of [the component (B) (normality)/the component (A) (% by weight)] 0.010 or more, and it is preferable still at 0.03 or more.

When a large amount of water exists in the coating liquid, hydrolysis reaction of the silicon alkoxide is promoted in the liquid and dehydration condensation reaction tends to occur, and in drying after application of the coating liquid, unevenness of the film thickness tends to occur, therefore, it is preferable that the concentration of water in the coating liquid is as low as possible. Therefore, the concentration of water in the coating liquid is from 0 to 10% by weight, and preferably from 0 to 2% by weight.

By thus maintaining the concentration of water in the coating liquid, the hydrolysis reaction of the remaining alkoxyl group in the reaction formula (1) and the dehydration condensation reaction in the reaction formula (2) do not easily occur in the coating liquid before the application, which is also dependent on keeping the pH in the coating liquid and keeping the concentration of at least one of either the silicon alkoxide in the coating liquid or the hydrolyzate thereof (including a partial hydrolyzate). Even if the concentration of water in the coating liquid is zero, the hydrolysis reaction is not disturbed since the film after being coated on the substrate absorbs water in air. However, since a usual alcohol solvent originally contains a small amount of water and the acid is often added in the form of an aqueous solution, the concentration of water in the coating liquid is usually 0.1% by weight or more.

When the concentration of the acid catalyst in the coating liquid is kept relatively low, it is preferable that the water content of the coating liquid is kept relatively high, and, when the concentration of water in the coating liquid is kept relatively low, it is preferable that the concentration of the acid catalyst in the coating liquid is kept relatively high. Specifically, the coating liquid preferably contains the acid (B) and water (C) in an amount of [the component (B) (normality) X the component (C) (% by weight)] of 0.0020 or more. For example, when the concentration of the acid catalyst in the coating liquid is less than 0.003 normality and the concentration of water is zero or very low, the hydrolysis reaction tends to be insufficient by water absorption only from air into the applied film. Therefore, it is preferable that a coating liquid having a concentration of the acid catalyst of, for example, 0.0010 normality contains water in an amount of about 2.0% by weight or more.

When a silicon alkoxide and an acid are dissolved in the abovementioned proportion into an alcohol solvent and the resulting solution is stirred, mainly the silicon alkoxide forms a hydrolyzate by the reaction (1) and a part of the hydrolyzate causes dehydration condensation reaction by the reaction (2), in the solution. Thus, coating liquid is prepared, and in this coating liquid, the silicon alkoxide exists in the form of a monomer (including a hydrolyzate) or a polymer of less than 20-mer.

When the abovementioned coating liquid is applied on a substrate, the coated liquid that has formed a film has increased the specific surface area, consequently, the alcohol solvent in the film quickly vaporizes, and the concentration of at least one of either the silicon alkoxide or the hydrolyzate thereof (including a partial hydrolyzate) increases steeply, the hydrolysis reaction and the dehydration condensation reaction (including further polycondensation reaction of the abovementioned polymer of less than 20-mer) which have been suppressed suddenly occur to form a large amount of siloxane bonds (. . . Si—O—Si. . . ) in the applied film, and as a result, a film mainly composed of silica having high compactness and having a thickness of 5 to 300 nm is formed causing a strong bond between the surface of the substrate and the film. Thus, in the present invention, reactivity in film-forming is high, a film extremely compact is formed by reaction at room temperature, and baking thereafter is not necessary.

As in the prior art, coating liquid before an application contains a large amount of siloxane bonds generated by a dehydration condensation reaction, and when a polymer having a polymerization degree of 20 or more is contained, the resulting silica film contains siloxane bonds, however, siloxane bonds connecting the surface of the substrate and the silica film are not formed in such large amounts, therefore, the bond between the surface of the substrate and the silica film is not so strong. For reinforcing this bond, conventionally baking at higher temperatures is further required.

Furthermore, according to the present invention, since hydrolysis reaction and dehydration condensation reaction of the silicon alkoxide partial hydrolyzate which has not been completely hydrolyzed in the abovementioned coating liquid progress simultaneously, an alkoxyl group is not hydrolyzed and remains on the surface of the formed silica film, and when a functional film is coated on this silica film as a primer film as described below, the adhesion of the functional film can be improved. For forming a compact silica film by a conventional sol-gel method, it is necessary that the dehydrated and concentrated silica film is usually heated at temperatures from 500 to 600° C.

In the present invention, a compact silica film is formed only by natural drying or forcible drying at normal temperatures (e.g., at room temperature) or at a temperature of 150° C. or less for 30 seconds to 5 minutes after application of the abovementioned coating liquid. When the abovementioned applied film is heated at a temperature of 150° C. or more, the silica film neither increases the compactness further, nor improves adhesion of the functional film to be coated on the silica film.

Whether an alkoxyl group remains on the surface of the abovementioned silica film or not is known by measuring the static water drop contact angle on the surface of the silica film. As described in examples below, the static water drop contact angle of the surface of the silica film according to the present invention is from 20 to 40°. In contrast, when a silica film is formed by the conventional sol-gel method and baked at a temperature of 500 to 600° C. for compactness of the film, the value of the static water drop contact angle is several degrees or less. The reason for such a decrease in the static water drop contact angle is hypothesized in that though alkoxyl groups remain on the surface of the silica film before baking, the alkoxyl groups are decomposed by the abovementioned baking and the number of hydroxyl groups on the surface of the silica increases for hydrophilization.

Even if a silica film having a hydroxyl group on the surface thereof is utilized as a primer film, and liquid for forming a functional film containing an organosilane is applied on the primer film, water in air bonds to a hydroxyl group on the surface of the silica primer film and water is adsorbed on the surface of the primer film before application of the organosilane, in a usual environment, therefore, it is difficult to form a chemical bond between the silica primer film and the organosilane at normal temperatures.

In the present invention, since the surface of the silica film has a large amount of alkoxyl groups remaining and a few hydroxyl groups, adsorption of water in air onto the surface of the primer film is believed to be prevented. Therefore, when liquid for forming a functional film containing an organosilane is applied on this silica primer film, a chemical bond can be formed between the silica primer film and the organosilane at normal temperatures and the functional film can be adhered securely to the silica primer film by a reaction between the alkoxyl group on the silica primer film and the silanol group on the organosilane (hydroxyl group or hydrolyzed functional group).

Also regarding surfaces of oxide-based primers, glass and ceramics, or hydrophilizated metal and plastics, it is difficult to form a chemical bond between applied organosilanes as described above, however, according to the present invention, a functional film can be securely adhered to a substrate by forming on the surface of this substrate a silica primer layer having an alkoxyl group remaining. When this silica primer film is heated at high temperatures, the remaining alkoxyl group disappears, and a hydroxyl group is formed instead, therefore, when the functional film to be coated thereon is to be adhered securely, the silica primer film should not be heated previously at a temperature of over 150° C.

Furthermore, the silica film formed by the present invention has extremely excellent surface smoothness. Therefore, a functional film obtained by applying a functional organosilane on this silica film primer also has extremely excellent surface smoothness. Namely, the surfaces of the silica film and the functional film have an arithmetical mean roughness of (Ra)=0.5 nm or less, particularly of 0.10 to 0.5 nm, and have a ten points mean roughness of (Rz)=5.0 nm or less, particularly of 1.0 to 5.0 nm. This surface roughness Ra and Rz can be measured using an atomic force microscope (AFM)(manufactured by SEIKO Electronics Co., Ltd., scanning type probe microscope "SPI3700", cantilever; made of silicon "SI-DF20") by a method in which JIS B 0601 defined by two dimensions is enlarged to three dimensions. In this case, the measuring area of the sample was the square of 1 $\mu$m×1 $\mu$m, and the surface form was measured at a measuring point number of 512×256, a scanning speed of 1.02 Hz and DFM (cyclic contact mode), correction by a low-pass filter and leveling correction of measured data (curve was drawn by approximate least-squares method and fitted, inclination of data was corrected, furthermore, strain in the z axis was deleted) were conducted and values of the surface roughness Ra and Rb were calculated.

One reason why a functional film coated on the silica-based film according to the present invention has excellent water-repellent performance, excellent low abrasion resistance, excellent water drop rolling property, excellent pollution resistance and excellent durability is assumed to be due to excellent smoothness of the surface of the functional film coated on a silica film having excellent smoothness. And the reason for this excellent smoothness obtained of the silica film is hypothesized as follows. Namely, it is estimated that a silicon alkoxide is uniformly dissolved in a solvent in the form of a monomer (including a hydrolyzate) or a polymer of 20-mer or less in coating liquid before application, and after application, a compact silica film is formed at room temperature by effects of the existence of an acid catalyst in high concentration and a steep increase in concentration of the silicon alkoxide (including a hydrolyzate), therefore, excellent smoothness is obtained.

In comparison, when a solution prepared by dissolving, for example, a chlorosilyl group-containing compound such as tetrachlorosilane into a non-aqueous solvent is applied instead of the silicon alkoxide used in the present invention, because of very high reactivity of the chlorosilyl group-containing compound, the reaction becomes ununiform, and the surface roughness of the resulting film is for example 7.9 nm in terms of arithmetic mean roughness of (Ra) or 29.8 nm in terms of ten points mean roughness (Rz) manifesting poorer smoothness as compared with that of the present invention.

The abovementioned illustrations relate to coated articles of a film composed of only silica, however, the present invention can be applied also to coated articles of a film mainly composed of silica. Namely, durability can be further improved by adding as a film component an oxide of an atom other than silicon such as aluminum, zirconium, titanium, cesium and the like and by substituting the silica in an amount of at most 30% by weight, usually from 1 to 30% by weight in terms of the oxide to give a silica-based multi-component oxide film. Among them, aluminum and zirconium are preferable since they reinforce the primer itself and reinforce the bond with a functional film. When the amount added by the oxide of an atom other than silicon is less than 1% by weight, the effects by addition are not obtained, and when over 30% by weight, the compactness of the film is lost and durable film is not obtained.

It is preferable that these oxides are added in the form of a chelated compound obtained by chemically modifying an alkoxide of these metals with $\beta$-diketone, acetic acid, trifluoroacetic acid, ethanolamine and the like. In particular, when a metal alkoxide is chemically modified with acetylacetone which is one $\beta$-diketone, stability of the solution is excellent and a relatively durable film is obtained.

For producing the silica-based film-coated article according to the present invention, coating liquid composed of the abovementioned alcohol solution is applied on the surface of a substrate such as glass, ceramics, plastics, metals and the like under normal temperatures and normal pressure, and naturally dried or forcibly dried under normal temperatures and normal pressure or at a temperature of 150° C. or less for 30 seconds to 5 minutes.

Since a hydrophilic group such as a hydroxyl group exists on the surface of a substrate such as glass, ceramics and metal, when the abovementioned coating liquid is applied, a film is formed on the substrate. However, depending on the kind of plastic substrates, the number of hydrophilic groups on the surface thereof may sometimes be low and wetting property with alcohol is poor, then, the coating liquid may be repelled on the substrate surface and a film may not be easily formed. In the case of such a substrate having a few hydrophilic groups on the surface thereof, it is preferable that the surface is previously treated by plasma containing oxygen or a corona atmosphere for hydrophilization, or the substrate surface is irradiated with ultraviolet rays having wavelengths of about 200 to 300 nm in an atmosphere containing oxygen to conduct hydrophilization treatment, then, silica-based film coating treatment is conducted.

The method for applying the coating liquid for forming a silica-based film is not particularly restricted, and examples thereof include dip coat, flow coat, spin coat, bar coat, roll coat, spray coat, a hand applying method, a brush applying method and the like.

According to the present invention, a compact and hard silica-based film can be formed on the surface of a substrate such as glass, ceramics, metal, plastics and the like without heating at high temperature. This film has the ability to block an alkali from the substrate, or is useful as a primer film for improving bonding strength between the substrate and a functional film, and a functional film can be formed such as a water-repellent film, oil repellent film, mist resistant film, pollution resistant film, high abrasion resistant film, reflection resistant film or other optical film, electrically conductive film, semiconductive film, protective film and the like, by applying, for example, an organosilane having a hydrolyzable group and a functional group having a specific function or a hydrolyzate thereof (including a partial hydrolyzate) onto the abovementioned silica-based film or by conducting other coating.

The hydrolyzable group of the abovementioned organosilane is not particularly restricted, and examples thereof include halogen, hydrodien, alkoxyl, acyloxy, isocyanateand the like. In particular, the alkoxyl group is preferable since the reaction thereof is not extremely severe and handling thereof such as storage and the like is relatively easy.

The coating method for water-repellent and oil repellent functional film is not particularly restricted, and methods in which treatment is conducted using a fluoroalkyl group as a water-repellent functional group and an organosilane having a hydrolyzable group are preferable.

As the organosilane containing a fluoroalkyl group, perfluoroalkyl group-containing trichlorosilanes such as $CF_3(CF_2)_{11}(CH_2)_2SiCl_3$, $CF_3(CF_2)_{10}(CH_2)Si(Cl)_3$, $CF_3(CF_2)_9(CH_2)_2SiCl_3$, $CF_3(CF_2)_8(CH_2)_2SiCl_3$, $CF_3(CF_2)_7(CH_2)_2SiCl_3$, $CF_3(CF_2)_6(CH_2)_2SiCl_3$, $CF_3(CF_2)_5(CH_2)_2SiCl_3$, $CF_3(CF_2)_4(CH_2)_2SiCl_3$, $CF_3(CF_2)_3(CH_2)_2SiCl_3$, $CF_3(CF_2)_2(CH_2)_2SiCl_3$, $CF_3CF_2(CH_2)_2SiCl_3$, $CF_3(CH_2)_2SiCl_3$; perfluoroalkyl group-containing trialkoxysilanes such as $CF_3(CH_2)_2SiCl_3CF_3(CF_2)_{11}(CH_2)_2Si(OCH_3)_3$, $CF_3(CF_2)_{10}(CH_2)_2Si(OCH_3)_3$, $CF_3(CF_2)_9(CH_2)_2Si(OCH_3)_3$, $CF_3(CF_2)_8(CH_2)_2Si(OCH_3)_3$, $CF_3(CF_2)_7(CH_2)_2Si(OCH_3)_3$, $CF_3(CF_2)_6(CH_2)_2Si(OCH_3)_3$, $CF_3(CF_2)_5(CH_2)_2Si(OCH_3)_3$, $CF_3(CF_2)_4(CH_2)_2Si(OCH_3)_3$, $CF_3(CF_2)_3(CH_2)_2Si(OCH_3)_3$, $CF_3(CF_2)_2(CH_2)_2Si(OCH_3)_3$, $CF_3CF_2(CH_2)_2Si(OCH_3)_3$, $CF_3(CH_2)_2Si(OCH_3)_3$, $CF_3(CF_2)_{11}(CH_2)_2Si(OC_2H_5)_3$, $CF_3(CF_2)_{10}(CH_2)_2Si(OC_2H_5)_3$, $CF_3(CF_2)_9(CH_2)_2Si(OC_2H_5)_3$, $CF_3(CF_2)_8(CH_2)_2Si(OC_2H_5)_3$, $CF_3(CF_2)_7(CH_2)_2Si(OC_2H_5)_3$, $CF_3(CF_2)_6(CH_2)_2Si(OC_2H_5)_3$, $CF_3(CF_2)_5(CH_2)_2Si(OC_2H_5)_3$, $CF_3(CF_2)_4(CH_2)_2Si(OC_2H_5)_3$, $CF_3(CF_2)_3(CH_2)_2Si(OC_2H_5)_3$, $CF_3(CF_2)_2(CH_2)_2Si(OC_2H_5)$, $CF_3CF_2(CH_2)_2Si(OC_2H_5)_3$, $CF_3(CH_2)_2Si(OC_2H_5)_3$; perfluoroalkyl group-containing triacyloxysilanes such as $CF_3(CF_2)_{11}(CH_2)_2Si(OCOCH_3)_3$, $CF_3(CF_2)_{10}(CH_2)_2Si(OCOCH_3)_3$, $CF_3(CF_2)_9(CH_2)_2Si(OCOCH_3)_3$, $CF_3(CF_2)_8(CH_2)_2Si(OCOCH_3)_3$, $CF_3(CF_2)_7(CH_2)_2Si(OCOCH_3)_3$, $CF_3(CF_2)_6(CH_2)_2Si(OCOCH_3)_3$, $CF_3(CF_2)_5(CH_2)_2Si(OCOCH_3)_3$, $CF_3(CF_2)_4(CH_2)_2Si(OCOCH_3)_3$, $CF_3(CF_2)_3(CH_2)_2Si(OCOCH_3)_3$, $CF_3(CF_2)_2(CH_2)_2Si(OCOCH_3)_3$, $CF_3CF_2(CH_2)_2Si(OCOCH_3)_3$, $CF_3(CH_2)_2Si(OCOCH_3)_3$ perfluoroalkyl group-containing triisocyanatesilanes such as $CF_3(CF_2)_{11}(CH_2)_2Si(NCO)_3$, $CF_3(CF_2)_{10}(CH_2)_2Si(NCO)_3$, $CF_3(CF_2)_9(CH_2)_2Si(NCO)_3$, $CF_3(CF_2)_8(CH_2)_2Si(NCO)_3$, $CF_3(CF_2)_7(CH_2)_2Si(NCO)_3$, $CF_3(CF_2)_6(CH_2)_2Si(NCO)_3$, $CF_3(CF_2)_5(CH_2)_2Si(NCO)_3$, $CF_3(CF_2)_4(CH_2)_2Si(NCO)_3$, $CF_3(CF_2)_3(CH_2)_2Si(NCO)_3$, $CF_3(CF_2)_2(CH_2)_2Si(NCO)_3$, $CF_3CF_2(CH_2)_2Si(NCO)_3$, $CF_3(CH_2)_2Si(NCO)_3$ can be exemplified.

Furthermore, a functional film having water-repellent performance or high abrasion resistance can also be obtained by treatment using an organosilane containing an alkyl group. This organosilane is not particularly restricted, and organosilanes containing a straight-chain alkyl group having 1 to 30 carbon atoms and a hydrolyzable group can be preferably used.

As the organosilane containing an alkyl group, alkyl group-containing chlorosilanes such as $CH_3(CH_2)_{30}SiCl_3$, $CH_3(CH_2)_{20}SiCl_3$, $CH_3(CH_2)_{18}SiCl_3$, $CH_3(CH_2)_{16}SiCl_3$, $CH_3(CH_2)_{14}SiCl_3$, $CH_3(CH_2)_{12}SiCl_3$, $CH_3(CH_2)_{10}SiCl_3$, $CH_3(CH_2)_9SiCl_3$, $CH_3(CH_2)_8SiCl_3$, $CH_3(CH_2)_7SiCl_3$, $CH_3(CH_2)_6SiCl_3$, $CH_3(CH_2)_5SiCl_3$, $CH_3(CH_2)_4SiCl_3$, $CH_3(CH_2)_3SiCl_3$, $CH_3(CH_2)_2SiCl_3$, $CH_3CH_2SiCl_3$, $(CH_3CH_2)_2SiCl_2$, $(CH_3CH_2)_3SiCl$, $CH_3SiCl_3$, $(CH_3)_2SiCl_2$, $(CH_3)_3SiCl$; alkyl group-containing alkoxysilanes such as $CH_3(CH_2)_{30}Si(OCH_3)_3$, $CH_3(CH_2)_{20}Si(OCH_3)_3$, $CH_3(CH_2)_{18}Si(OCH_3)_3$, $CH_3(CH_2)_{16}Si(OCH_3)_3$, $CH_3(CH_2)_{14}Si(OCH_3)_3$, $CH_3(CH_2)_{12}Si(OCH_3)_3$, $CH_3(CH_2)_{10}Si(OCH_3)_3$, $CH_3(CH_2)_9Si(OCH_3)_3$, $CH_3(CH_2)_8Si(OCH_3)_3$, $CH_3(CH_2)_7Si(OCH_3)_3$, $CH_3(CH_2)_6Si(OCH_3)_3$, $CH_3(CH_2)_5Si(OCH_3)_3$, $CH_3(CH_2)_4Si(OCH_3)_3$, $CH_3(CH_2)_3Si(OCH_3)_3$, $CH_3(CH_2)_2Si(OCH_3)_3$, $CH_3CH_2Si(OCH_3)_3$, $(CH_3CH_2)_2Si(OCH_3)_2$, $(CH_3CH_2)_3SiOCH_3$, $CH_3Si(OCH_3)_3$, $(CH_3)_2Si(OCH_3)_2$, $(CH_3)_3SiOCH_3$, $CH_3(CH_2)_{30}Si(OC_2H_5)_3$, $CH_3(CH_2)_{20}Si(OC_2H_5)_3$, $CH_3(CH_2)_{18}Si(OC_2H_5)_3$, $CH_3(CH_2)_{16}Si(OC_2H_5)_3$, $CH_3(CH_2)_{14}Si(OC_2H_5)_3$, $CH_3(CH_2)_{12}Si(OC_2H_5)_3$, $CH_3(CH_2)_{10}Si(OC_2H_5)_3$, $CH_3(CH_2)_9Si(OC_2H_5)_3$, $CH_3(CH_2)_8Si(OC_2H_5)_3$, $CH_3(CH_2)_7Si(OC_2H_5)_3$, $CH_3(CH_2)_6Si(OC_2H_5)_3$, $CH_3(CH_2)_5Si(OC_2H_5)_3$, $CH_3(CH_2)_4Si(OC_2H_5)_3$, $CH_3(CH_2)_3Si(OC_2H_5)_3$, $CH_3(CH_2)_2Si(OC_2H_5)_3$, $CH_3CH_3CHQSi(OC_2H_5)_3$, $(CH_3CH_2)_2Si(OC_2H_5)_2$, $(CH_3CH_2)_3SiOC_2H_5$, $CH_3Si(OC_2H_5)_3$, $(CH_3)_2Si(OC_2H_5)_2$, $(CH_3)_3SiOC_2H_5$; alkyl group-containing acyloxysilanes such as $CH_3(CH_2)_{30}Si(OCOCH_3)_3$, $CH_3(CH_2)_{20}Si(OCOCH_3)_3$, $CH_3(CH_2)_{18}Si(OCOCH_3)_3$, $CH_3(CH_2)_{16}Si(OCOCH_3)_3$, $CH_3(CH_2)_{14}Si(OCOCH_3)_3$, $CH_3(CH_2)_{12}Si(OCOCH_3)_3$, $CH_3(CH_2)_{10}Si(OCOCH_3)_3$, $CH_3(CH_2)_9Si(OCOCH_3)_3$, $CH_3(CH_2)_8Si(OCOCH_3)_3$, $CH_3(CH_2)_7Si(OCOCH_3)_3$, $CH_3(CH_2)_6Si(OCOCH_3)_3$, $CH_3(CH_2)_5Si(OCOCH_3)_3$, $CH_3(CH_2)_4Si(OCOCH_3)_3$, $CH_3(CH_2)_3Si(OCOCH_3)_3$, $CH_3(CH_2)_2Si(OCOCH_3)_3$, $CH_3CH_2Si(OCOCH_3)_3$, $(CH_3CH_2)_2Si(OCOCH_3)_2$, $(CH_3CH_2)_3SiOCOCH_3$, $CH_3Si(OCOCH_3)_3$, $(CH_3)_2Si(OCOCH_3)_2$, $(CH_3)_3SiOCOCH_3$; alkyl group-containing isoycanatesilanes such as $CH_3(CH_2)_{30}Si(NCO)_3$, $CH_3(CH_2)_{20}Si(NCO)_3$, $CH_3(CH_2)_{18}Si(NCO)_3$, $CH_3(CH_2)_{16}Si(NCO)_3$, $CH_3(CH_2)_{14}Si(NCO)_3$, $CH_3(CH_2)_{12}Si(NCO)_3$, $CH_3(CH_2)_{10}Si(NCO)_3$, $CH_3(CH_2)_9Si(NCO)_3$, $CH_3(CH_2)_8Si(NCO)_3$, $CH_3(CH_2)_7Si(NCO)_3$, $CH_3(CH_2)_6Si(NCO)_3$, $CH_3(CH_2)_5Si(NCO)_3$, $CH_3(CH_2)_4Si(NCO)_3$, $CH_3(CH_2)_3Si(NCO)_3$, $CH_3(CH_2)_2Si(NCO)_3$, $CH_3CH_2Si(NCO)_3$, $(CH_3CH_2)_2Si(NCO)_2$, $(CH_3CH_2)_3SiNCO$, $CH_3Si(NCO)_3$, $(CH_3)_2Si(NCO)_2$, $(CH_3)_3SiNCO$ can be exemplified.

Furthermore, a functional film can be obtained which manifests low critical inclined angles at which a water drop starts to roll and low pollution adsorption or adhesion by conducting treatment using an organosilane having a polyalkylene oxide group and a hydrolyzable group in the molecule.

As the abovementioned polyalkylene oxide group, a polyethylene oxide group, polypropylene oxide group and the like are mainly used. Examples of the organosilane having these groups include organosilanes such as [alkoxy(polyalkyleneoxy)alkyl]trialkoxysilane, N-(triethoxysilylpropyl)-O-polyethylene-oxide urethane, [alkoxy(polyalkyleneoxy)alkyl]trichlorosilane, N-(trichlorosilylpropyl)-O-polyethylene-oxide urethane and the like, and more specifically, [methoxy(polyethyleneoxy)propyl]trimethoxysilane, [methoxy(polyethyleneoxy)propyl]triethoxysilane, [butoxy(polypropyleneoxy)propyl]trimethoxysilane and the like are preferably used.

When this organosilane is dissolved in an alcohol solvent and hydrolyzed using an acid catalyst and the resulting solution is applied on the abovementioned silica-based film (primer film), a de-alcohol reaction occurs between an alkoxyl group on the surface of the primer film and a silanol group of the organosilane and the primer film is bonded to the organosilane via siloxane bond without conducting heat treatment. When the hydrolyzable functional group of the abovementioned organosilane has high reactivity, for example, when the organosilane has a chloro group, isocyanate group, acyloxy group and the like, the bond between the primer film and the organosilane is formed by a reaction of the group with silanol co-existing with an alkoxyl group on the surface of the primer film or a small amount of water, therefore, the abovementioned organosilane may be applied as it is without dilution or a solution prepared only by diluting the organosilane with a non-aqueous solvent such as perfluorocarbon, methylene chloride, hydrocarbon, silicone and the like may also be applied. As described above, a functional film can be securely adhered to a substrate by using as a primer film a silica-based film having an alkoxyl group remaining on the surface.

The method for applying a functional film is not particularly restricted like in the case of the coating treatment of a silica-based film, and examples thereof include flow coat, roll coat, spray coat, a hand applying method, a brush applying method and the like.

BEST MODE FOR CARRYING OUT THE INVENTION

The following examples further illustrate the present invention.

EXAMPLE 1

0.4 g of tetraethoxysilane (manufactured by Shin-Etsu Silicone Co., Ltd.) and 1 g of concentrated hydrochloric acid (35% by weight, manufactured by Kanto Kagaku) were added to 98.6 g of ethanol (manufactured by NAKARAITESK) while stirring to obtain silica film treating liquid. The contents of tetraethoxysilane (in terms of silica), hydrochloric acid and water in this treating liquid are as shown in Table 1.

Then, 1 g of $CF_3(CF_2)_7(CH_2)_2Si(OCH_3)_3$ (heptadecafluorodecyltrimethoxysilane, manufactured by Toshiba Silicone K.K.) was dissolved in 98 g of ethanol, and 1.0 g of 0.1 normality hydrochloric acid was added and the mixture was stirred for 1 hour to obtain a water-repellent treating agent.

The abovementioned silica film treating liquid was applied on a washed soda lime silicate glass substrate (300×300 mm) at a humidity of 30% and at room temperature by the flow coat method, dried for about 1 minute, to coat the surface of the glass plate with a silica film having a thickness of about 40 nm. The hardness of this silica film was measured in terms of pencil hardness. The film was scratched with a pencil having an "H" core, however, no flaw was formed. Furthermore, the abovementioned silica film treating solution was left for about 10 days at room temperature as it was, then, used to find completely the same result.

Then, 3 ml of the abovementioned water-repellent treating agent on a cloth was applied on the surface of the glass substrate coated by the silica film and adhered excess water-repellent treating agent was wiped off by a new cloth, to obtain a water-repellent treated glass.

The initial static water drop contact angle on this water-repellent treated glass was measured at a water drop weight of 2 mg (hereinafter, simply referred to as contact angle), using a contact angle meter (CA-DT, manufactured by Kyowa Kaimen Kagaku). Regarding smoothness of the resulting film, the surface form was measured by using an atomic force microscope (SPI3700, manufactured by SEIKO Electronics Co., Ltd.) at cyclic contact mode, and the surface toughness Ra and Rz was calculated. For the abrasion test, a cloth was attached to a reciprocating abrasion tester (manufactured by Shinto Kagaku), slid to and from 3000 times on the surface of the water-repellent film at a load of 0.3 kg/cm$^2$, then, the contact angle was measured. The contact angle on the silica film surface before application of the water-repellent agent was also measured for reference. The contact angle of the clean glass substrate itself was about several degree or less. These measurement results are shown in Table 2.

The surface of the water-repellent film before the abrasion test was observed visually and unevenness of the film was measured, whereby no evenness is described as OK and unevenness occurring is described as NG, respectively, in Table 2.

As shown in the table, the contact angle of the silica film surface was 30°, the initial contact angle after the water-repellent treatment was 108° and the contact angle after the abrasion test was 95°. Regarding surface roughness of the silica film it was found that, Ra=0.4 nm, Rz=2.9 nm, and regarding the surface roughness after the water-repellent treatment it was found that, Ra=0.3 nm, Rz=2.8 nm. Regarding the surface roughness of the washed soda lime silicate glass substrate before coating of the silica film it was found that, Ra=0.7 nm, Rz=8.0 nm.

EXAMPLE 2

A water-repellent treated glass was obtained in the same manner as in Example 1 except that the tetraethoxysilane used for the preparation of the silica film treating liquid in Example 1 was substituted with tetramethoxysilane (manufactured by Tokyo Kasei). The composition of the silica film treating liquid is shown in Table 1, and the thickness, various contact angles and surface roughness of the silica film are shown in Table 2, respectively.

As shown in Table 2, the contact angle of the silica film surface before the application of the water-repellent agent was 31°, the initial contact angle after the water-repellent treatment was 108° and the contact angle after the abrasion test was 97°. Regarding surface roughness of the silica film it was found that, Ra=0.3 nm, Rz=2.8 nm, and regarding the surface roughness after the water-repellent treatment it was found that, Ra=0.3 nm, Rz=2.7 nm.

EXAMPLE 3

A water-repellent treated glass was obtained in the same manner as in Example 1 except that the application of the silica film treating liquid was conducted by a spray method.

As shown in Table 2, the contact angle of the silica film surface before the application of the water-repellent agent was 30°, the initial contact angle after the water-repellent treatment was 108° and the contact angle after the abrasion test was 95°. Regarding surface roughness of the silica film it was found that, Ra=0.4 nm, Rz=3.0 nm, and regarding the surface roughness after the water-repellent treatment it was found that, Ra=0.4 nm, Rz=2.9 nm.

EXAMPLE 4

9.8 g of acetylacetone and 25.4 g of aluminum-tri-sec-butoxide (manufactured by Kanto Kagaku) were dissolved in 64.8 g of ethanol to obtain alumina material liquid in a concentration of 5% by weight in terms of oxides.

0.12 g of the abovementioned alumina material liquid, 0.33 g of tetraethoxysilane, 1 g of concentrated hydrochloric acid and 98.5 g of ethanol were mixed to prepare a silica-based film treating liquid. The composition of this silica-based film treating liquid is shown in Table 1.

A water-repellent treated glass was obtained in the same manner as in Example 1 except that the silica film treating liquid in Example 1 was substituted with the abovementioned silica-based film treating liquid. The thickness, various contact angles and surface roughness of the silica film are shown in Table 2, respectively.

As shown in Table 2, the contact angle of the silica film surface before the application of the water-repellent agent as 31°, the initial contact angle after the water-repellent treatment was 106° and the contact angle after the abrasion test was 104°. Regarding surface roughness of the silica film it was found that, Ra=0.4 nm, Rz=3.3 nm, and regarding the surface roughness after the water-repellent treatment it was found that, Ra=0.4 nm, Rz=3.0 nm.

EXAMPLE 5

4.1 g of acetylacetone and 17.4 g of zirconium-tetra-n-butoxide (manufactured by Kanto Kagaku) were dissolved in 78.6 g of ethanol to obtain zirconia material liquid in a concentration of 5% by weight in terms of oxides.

0.12 g of the abovementioned zirconia material liquid, 0.33 g of tetraethoxysilane, 1 g of concentrated hydrochloric acid and 98.5 g of ethanol were mixed to prepare a silica-based film treating liquid. The composition of this silica-based film treating liquid is shown in Table 1.

A water-repellent treated glass was obtained in the same manner as in Example 1 except that the silica film treating liquid in Example 1 was substituted with the abovementioned silica-based film treating liquid. The thickness, various contact angles and surface roughness of the silica film are shown in Table 2, respectively.

As shown in Table 2, the contact angle of the silica film surface before the application of the water-repellent agent was 29°, the initial contact angle after the water-repellent treatment was 107° and the contact angle after the abrasion test was 103°. Regarding surface roughness of the silica film it was found that, Ra=0.4 nm, Rz=3.4 nm, and regarding the surface roughness after the water-repellent treatment it was found that, Ra=0.4 nm, Rz=3.2 nm.

EXAMPLES 6 THROUGH 9

Ethanol (manufactured by NAKARAITESK), tetraethoxysilane (manufactured by Shin-Etsu Silicone Co., Ltd.) and concentrated hydrochloric acid (35% by weight, manufactured by Kanto Kagaku) were compounded in proportions shown in Table 3 to obtain silica film treating liquids. The compositions of the silica film treating liquids are shown in Table 1.

Water-repellent treated glasses were obtained and measurements were conducted in the same manner as in Example 1 except that the silica film treating liquid in Example 1 was substituted with the abovementioned silica-based film treating liquids. The thickness, various contact angles and surface roughness of the silica films are shown in Table 2, respectively.

EXAMPLES 10 THROUGH 13

Water-repellent treated glasses were obtained in the same manner as in Example 1 except that $CF_3(CF_2)_7(CH_2)_2Si(OCH_3)_3$ (heptadecafluorodecyltrimethoxysilane, manufactured by Toshiba Silicone K.K.) used for preparation of the water-repellent treating liquid in Example 1 was substituted with $CF_3(CF_2)_5(CH_2)_2Si(OCH_3)_3$ (tridecafluorooctyltrimethoxysilane, manufactured by Toshiba Silicone K.K.) in Example 10, $CF_3(CF_2)_3(CH_2)_2SiCl_3$ (nonafluorohexyltrichlorosilane, manufactured by Chisso K.K.) in Example 11, $CF_3(CF_2)_2Si(OCH_3)_3$ (trifluoropropyltrimethoxysilane, manufactured by Chisso K.K.) in Example 12 and $CF_3(CF_2)_2Si(OCH_3)_3$ (trifluoropropyltrimethoxysilane, manufactured by Chisso K.K.) in Example 13, respectively. The various contact angles and the like are shown in Table 2.

As shown in Table 2, the initial contact angles after the water-repellent treatment were 80 to 107° and the contact angles after the abrasion test were 75 to 97°, and water-repellent films excellent in abrasion resistance were obtained.

EXAMPLES 14 THROUGH 18

Glasses having water-repellant performance and high abrasion resistance were obtained in the same manner as in Example 1 except that $CF_3(CF_2)_7(CH_2)_2Si(OCH_3)_3$ (heptadecafluorodecyltrimethoxysilane, manufactured by Toshiba Silicone K.K.) used for preparation of the water-repellent treating liquid in Example 1 was substituted with an alkyl silane. The compositions of the glasses having a water-repellant performance and high abrasion resistance are shown in Table 4.

The initial contact angle and the contact angle after the abrasion test were measured on these glasses having a water-repellant performance and high abrasion resistance. A dry cloth was attached to an abrasion coefficient measuring apparatus (manufactured by Shinto Kagaku) and the abrasion coefficient between the surface of the film and the dry cloth was measured. These measurement results are shown in Table 5. As shown in Table 5, the difference between the initial contact angle after the water-repellent treatment and the contact angle after the abrasion test was very small, and deterioration in water-repellent performance was scarcely observed. The abrasion coefficients with the dry cloth were from 0.2 to 0.25, namely glasses having smaller abrasion coefficients were obtained as compared with the glass treated by the organosilane having a fluoroalkyl group with an abrasion coefficient of 0.36 and the usual glass untreated having an abrasion coefficient of 0.42. The abrasion coefficients after the abrasion test revealed almost no change as compared with before the abrasion test.

EXAMPLE 19

A functional film having a lower critical inclined angle at which a water drop starts to roll and manifesting poor pollution adsorption or adhesion was obtained in the same manner as in Example 1 except that $CF_3(CF_2)_7(CH_2)_2Si(OCH_3)_3$ (heptadecafluorodecyltrimethoxysilane, manufactured by Toshiba Silicone K.K.) used for preparation of the water-repellent treating liquid in Example 1 was substituted with [methoxy(polyethyleneoxy)propyl]trimethoxysilane (manufactured by Chisso K.K., content: 90%, molecular weight: 460 to 590, ethylene oxide unit number: 6 to 9).

The contact angle of the abovementioned functional film was 38°. For obtaining a critical inclined angle which is a measure of the tendency for a water drop to roll, the resulting functional film treated glass sample was placed horizontally, a water drop having a diameter of 5 mm was placed on this plate, it was gradually inclined and the inclined angle from the horizontal position when the water drop started to roll was measured. This was an angle of 4°, namely, the surface on which a water drop rolls very easily was obtained. Furthermore, the contact angle after the abrasion test was 38° and the critical inclined angle after the abrasion test was 4°, namely, almost same abilities as before the abrasion test were maintained.

COMPARATIVE EXAMPLE 1

0.05 g of tetraethoxysilane (manufactured by Shin-Etsu Silicone Co., Ltd.) and 1 g of concentrated hydrochloric acid (35% by weight, manufactured by Kanto Kagaku) were added to 99 g of ethanol (manufactured by NAKARAITESK) while stirring to obtain a silica film treating liquid. The composition of the silica film treating liquid is shown in Table 1.

A water-repellent treated glass was obtained and measurements were conducted in the same manner as in Example 1 except that the silica film treating liquid in Example 1 was substituted with the abovementioned silica-based film treating liquids. The thickness, various contact angles and surface roughness of the silica films are shown in Table 2, respectively.

As shown in Table 2, the contact angle of the silica film surface before the application of the water-repellent agent was 29°, the initial contact angle after the water-repellent treatment was 105° and the contact angle after the abrasion test was 60°, namely, it is known that the water-repellent performance after the abrasion test decreases. Regarding surface roughness of the silica film it was found that, Ra=0.5 nm, Rz=6.2 nm, and regarding the surface roughness after the water-repellent treatment it was found that, Ra=0.5 nm, Rz=6.0 nm. It is known that smoothness of the film is poor since Rz of the silica film and Rz of the water-repellent film are both over 5.0 nm.

COMPARATIVE EXAMPLE 2

4 g of tetraethoxysilane (manufactured by Shin-Etsu Silicone Co., Ltd.) and 1 g of concentrated hydrochloric acid (35% by weight, manufactured by Kanto Kagaku) were added to 95 g of ethanol (manufactured by NAKARAITESK) while stirring to obtain a silica film treating liquid. The composition of the silica film treating liquid is shown in Table 1.

A water-repellent treated glass was obtained and measurements were conducted in the same manner as in Example 1 except that the silica film treating liquid in Example 1 was substituted with the abovementioned silica-based film treating liquids. The thickness, various contact angles and surface roughness of the silica films are shown in Table 2, respectively.

As shown in Table 2, the contact angle of the silica film surface before the application of the water-repellent agent was 25°, the initial contact angle after the water-repellent treatment was 110° and the contact angle after the abrasion test was 80°, namely, it is known that the water-repellent performance after the abrasion test decreases. Regarding surface roughness of the silica film it was found that, Ra=0.9 nm, Rz=8.8 nm, and regarding the surface roughness after the water-repellent treatment it was found that, Ra=0.8 nm, Rz=9.0 nm. It is known that smoothness of the film is poor since Ra and Rz of the silica film and the water-repellent film are over 9.0 nm and 5.0 nm, respectively. Furthermore, the resulting water-repellent film revealed unevenness.

COMPARATIVE EXAMPLE 3

0.4 g of tetraethoxysilane (manufactured by Shin-Etsu Silicone Co., Ltd.) and 0.5 g of 0.1 normality hydrochloric acid were added to 99.1 g of ethanol (manufactured by NAKARAITESK) while stirring to obtain silica film treating liquid. The composition of the silica film treating liquid is shown in Table 1.

A water-repellent treated glass was obtained and measurements were conducted in the same manner as in Example 1 except that the silica film treating liquid in Example 1 was substituted with the abovementioned silica-based film treating liquids. The thickness, various contact angles and surface roughness of the silica films are shown in Table 2, respectively.

As shown in Table 2, the contact angle of the silica film surface before the application of the water-repellent agent was 24°, the initial contact angle after the water-repellent treatment was 110° and the contact angle after the abrasion test was 70°, namely, it is known that the water-repellent performance after the abrasion test decreases. Regarding surface roughness of the silica film it was found that, Ra=0.8 nm, Rz=11.0 nm, and regarding the surface roughness after the water-repellent treatment it was found that, Ra=0.8 nm, Rz=10.5 nm, namely smoothness of the film was poor since Ra and Rz of the silica film and the water-repellent film were both over 5.0 nm and 5.0 nm.

COMPARATIVE EXAMPLE 4

0.4 g of tetraethoxysilane (manufactured by Shin-Etsu Silicone Co., Ltd.) and 20 g of concentrated hydrochloric acid (35% by weight, manufactured by Kanto Kagaku) were added to 89.6 g of ethanol (manufactured by NAKARAITESK) while stirring to obtain a silica film treating liquid. The composition of the silica film treating liquid is shown in Table 1.

A water-repellent treated glass was obtained and measurements were conducted in the same manner as in Example 1 except that the silica film treating liquid in Example 1 was substituted with the abovementioned silica-based film treating liquids. The thickness, various contact angles and surface roughness of the silica films are shown in Table 2, respectively.

As shown in Table 2, the contact angle of the silica film surface before the application of the water-repellent agent was 32°, the initial contact angle after the water-repellent treatment was 107° and the contact angle after the abrasion test was 87°, namely, it is known that the water-repellent performance after the abrasion test decreases. Furthermore, the resulting film revealed unevenness in thickness. Regarding surface roughness of the silica film it was found that, Ra=0.7 nm, Rz=9.8 nm, and regarding the surface roughness after the water-repellent treatment it was found that, Ra=0.7 nm, Rz=9.8 nm, namely smoothness of the film was poor since Ra and Rz of the silica film and the water-repellent film were both over 5.0 nm and 5.0 nm.

COMPARATIVE EXAMPLE 5

0.4 g of tetraethoxysilane (manufactured by Shin-Etsu Silicone Co., Ltd.) and 70 g of a hydrochloric acid methanol solution (10% by weight, manufactured by Kanto Kagaku) were added to 29.6 g of ethanol (manufactured by NAKARAITESK) while stirring to obtain a silica film treating liquid. The composition of the silica film treating liquid is shown in Table 1.

A water-repellent treated glass was obtained and measurements were conducted in the same manner as in Example 1 except that the silica film treating liquid in Example 1 was substituted with the abovementioned silica-based film treating liquids. The thickness, various contact angles and surface roughness of the silica films are shown in Table 2, respectively.

As shown in Table 2, the contact angle of the silica film surface before the application of the water-repellent agent was 30°, the initial contact angle after the water-repellent treatment was 108° and the contact angle after the abrasion test was 88°, namely, it is known that the water-repellent performance after the abrasion test decreases. Furthermore, the resulting film revealed unevenness in thickness. Regarding surface roughness of the silica film it was found that, Ra=0.7 nm, Rz=8.8 nm, and regarding the surface roughness after the water-repellent treatment it was found that, Ra=0.7 nm, Rz=7.8 nm, namely smoothness of the film was poor since Ra and Rz of the silica film and the water-repellent film were both over 5.0 nm and 5.0 nm.

COMPARATIVE EXAMPLE 6

0.4 g of tetraethoxysilane (manufactured by Shin-Etsu Silicone Co., Ltd.) and 1 g of concentrated hydrochloric acid (35% by weight, manufactured by Kanto Kagaku) were added to 86.25 g of ethanol (manufactured by NAKARAITESK) while stirring to obtain a silica film treating liquid. The composition of the silica film treating liquid is shown in Table 1.

A water-repellent treated glass was obtained and measurements were conducted in the same manner as in Example 1 except that the silica film treating liquid in Example 1 was substituted with the abovementioned silica-based film treating liquids. The thickness, various contact angles and surface roughness of the silica films are shown in Table 2, respectively.

As shown in Table 2, the contact angle of the silica film surface before the application of the water-repellent agent was 32°, the initial contact angle after the water-repellent treatment was 109° and the contact angle after the abrasion test was 86°, namely, it is known that the water-repellent performance after the abrasion test decreases. Furthermore, the resulting film revealed unevenness in thickness. Regarding surface roughness of the silica film it was found that, Ra=0.6 nm, Rz=9.8 nm, and regarding the surface roughness after the water-repellent treatment it was found that, Ra=0.7 nm, Rz=10.8 nm, namely smoothness of the film was poor since Ra and Rz of the silica film and the water-repellent film were both over 5.0 nm and 5.0 nm.

COMPARATIVE EXAMPLE 7

96 g of ethanol (manufactured by NAKARAITESK) was mixed with 4 g of a hydrolyzate (average molecular weight: 408.5, "HAS-10", manufactured by Colcoat K.K., silica content: 10% by weight) of ethyl silicate (average polymerization degree: about 5) to obtain silica film treating liquid. The composition of the silica film treating liquid is shown in Table 1. This silica film treating liquid was applied on a washed glass plate (300×300 mm) by flow coat at a humidity of 30% and at room temperature, and dried for about 1 minute. Then, the substrate was baked for 1 hour at 600° C. to obtain a silica film. The hardness of this silica film before the baking was measured in terms of pencil hardness. The film was scratched with a pencil having a "B" core and a flaw was found, however, when the film was scratched with a pencil having an "H" core, no flaw was formed.

Furthermore, this silica-film coated glass was washed by a supersonic wave in pure water for 10 minutes, and dried, then, the water-repellent treatment was conducted in the same manner as in Example 1 to obtain a water-repellent glass.

As shown in Table 2, the contact angle of the silica film surface before the application of the water-repellent agent was 20, the initial contact angle after the water-repellent treatment was 1060 and the contact angle after the abrasion test was 500, namely, it is known that the water-repellent performance after the abrasion test decreases significantly. Regarding surface roughness of the silica film it was found that, Ra=0.9 nm, Rz=12.1 nm, and regarding the surface roughness after the water-repellent treatment it was found that, Ra=0.8 nm, Rz=10.3 nm, namely smoothness of the film was poor since Ra and Rz of the silica film and the water-repellent film were both over 5.0 nm and 5.0 nm.

COMPARATIVE EXAMPLE 8

A glass having a water-repellent performance and low abrasion resistance was obtained in the same manner as in Example 15 except that the silica film applying step was not conducted in Example 15. The various contact angles and the like are shown in Table 5.

As shown in Table 5, the initial contact angle after the water-repellent treatment was 95° equivalent to that of the glass in Example 15, however, the contact angle after the abrasion test was 55° which was extremely lower when compared with the value (90°) of the glass in Example 15, namely, the film was poor in abrasion resistance. The abrasion resistance after the abrasion test was 0.45, namely, the low abrasion resistance function was also lost.

COMPARATIVE EXAMPLE 9

A glass having a water-repellent performance and low abrasion resistance was obtained in the same manner as in Example 19 except that the silica film applying step was not conducted in Example 19. The various contact angles and the like are shown in Table 5. This functional film had a contact angle of 38° and a critical incline angle of 4°, both are equivalent to the values measured in Example 19. However, the functional film after the abrasion test had a contact angle of 22° and a critical incline angle of 25°, namely, the abrasion resistance was poor since the decrease in the contact angle and the increase in the critical contact angle were remarkable.

TABLE 1

| | tetraalkoxy-silane (in terms of $SiO_2$) (% by weight) | aluminum tributoxide (in terms of $Al_2O_3$) (% by weight) | zirconium tetrabutoxide (in terms of $ZrO_2$) (% by weight) | hydrochloric acid (normality) | water (% by weight) |
|---|---|---|---|---|---|
| Example | | | | | |
| 1 | 0.12 | 0 | 0 | 0.09 | 0.7 |
| 2 | 0.16 | 0 | 0 | 0.09 | 0.7 |
| 3 | 0.12 | 0 | 0 | 0.09 | 0.7 |
| 4 | 0.095 | 0.006 | 0 | 0.09 | 0.8 |
| 5 | 0.095 | 0 | 0.006 | 0.09 | 0.8 |
| 6 | 0.014 | 0 | 0 | 0.05 | 0.5 |
| 7 | 0.058 | 0 | 0 | 0.005 | 0.5 |
| 8 | 0.58 | 0 | 0 | 0.2 | 2.0 |
| 9 | 2.3 | 0 | 0 | 0.5 | 5.0 |
| Comparative example | | | | | |
| 1 | 0.003 | 0 | 0 | 0.09 | 0.7 |
| 2 | 4.3 | 0 | 0 | 0.09 | 0.6 |
| 3 | 0.12 | 0 | 0 | 0.0004 | 0.5 |
| 4 | 0.12 | 0 | 0 | 2.0 | 13.0 |
| 5 | 0.12 | 0 | 0 | 2.0 | 0.5 |

TABLE 1-continued

| | tetraalkoxy-silane (in terms of $SiO_2$) (% by weight) | aluminum tributoxide (in terms of $Al_2O_3$) (% by weight) | zirconium tetrabutoxide (in terms of $ZrO_2$) (% by weight) | hydrochloric acid (normality) | water (% by weight) |
|---|---|---|---|---|---|
| 6 | 0.12 | 0 | 0 | 0.09 | 13.0 |
| 7 | 0.12 | 0 | 0 | 0.00003 | 0.3 |

TABLE 2

| | Silica-based film | | | water-repellent treated glass | | | |
|---|---|---|---|---|---|---|---|
| | film thickness (nm) | contact angle (deg.) | surface roughness Ra/Rz (nm)/(nm) | initial contact angle (deg.) | contact angle after abrasion test (deg.) | surface roughness Ra/RZ (nm)/(nm) | appear-ance |
| Example | | | | | | | |
| 1 | 40 | 30 | 0.4/2.9 | 108 | 95 | 0.3/2.8 | OK |
| 2 | 40 | 31 | 0.3/2.8 | 108 | 97 | 0.3/2.7 | OK |
| 3 | 40 | 30 | 0.4/3.0 | 108 | 95 | 0.4/2.9 | OK |
| 4 | 40 | 31 | 0.4/3.3 | 106 | 104 | 0.4/3.0 | OK |
| 5 | 35 | 29 | 0.4/3.4 | 107 | 103 | 0.4/3.2 | OK |
| 6 | 15 | 28 | 0.4/3.2 | 106 | 93 | 0.4/3.0 | OK |
| 7 | 30 | 30 | 0.3/3.3 | 107 | 91 | 0.3/3.2 | OK |
| 8 | 100 | 28 | 0.3/2.8 | 108 | 98 | 0.3/2.7 | OK |
| 9 | 250 | 27 | 0.3/2.4 | 108 | 90 | 0.3/2.3 | OK |
| 10 | 40 | 30 | 0.4/2.9 | 107 | 97 | 0.3/2.8 | |
| 11 | 40 | 30 | 0.4/2.9 | 101 | 90 | 0.3/2.8 | OK |
| 12 | 40 | 30 | 0.4/2.9 | 95 | 80 | 0.3/2.8 | OK |
| 13 | 40 | 30 | 0.4/2.9 | 80 | 75 | 0.3/2.8 | OK |
| Comparative example | | | | | | | |
| 1 | 5 or less | 29 | 0.5/6.2 | 105 | 60 | 0.5/6.0 | OK |
| 2 | 300 | 25 | 0.9/8.8 | 110 | 80 | 0.8/9.0 | NG |
| 3 | 45 | 24 | 0.8/11.0 | 110 | 70 | 0.8/10.5 | OK |
| 4 | 40 | 32 | 0.7/9.8 | 107 | 87 | 0.7/8.9 | NG |
| 5 | 40 | 30 | 0.7/8.8 | 108 | 88 | 0.7/7.8 | NG |
| 6 | 40 | 32 | 0.6/9.8 | 109 | 86 | 0.7/10.8 | NG |
| 7 | 40 | 2 | 0.9/12.1 | 106 | 50 | 0.8/10.3 | OK |

TABLE 3

| Example | ethanol (g) | tetraethoxy-silane (g) | concentrated hydrochloric acid (g) |
|---|---|---|---|
| 6 | 99.5 | 0.05 | 0.5 |
| 7 | 99.3 | 0.2 | 0.05 |
| 8 | 96.0 | 2.0 | 2.0 |
| 9 | 87.0 | 8.0 | 5.0 |

TABLE 4 

| Example | alkyl silane | (g) | 0,1 N-hydrochloric acid (g) | ethanol (g) |
|---|---|---|---|---|
| 14 | n-octadecyltrimethoxysilane | 1 | 1 | 98 |
| 15 | n-dodecyltrimethoxysilane | 1 | 1 | 98 |
| 16 | n-octyltriethoxysilane | 1 | 1 | 98 |
| 17 | n-pentyltriethoxysilane | 1 | 1 | 98 |
| 18 | trimethylethoxysilane | 1 | 1 | 98 |

TABLE 5

| | initial contact angle (deg.) | initial abrasion coefficient | contact angle after abrasion test (deg.) | abrasion coefficient after abrasion test |
|---|---|---|---|---|
| Example 14 | 95 | 0.23 | 94 | 0.24 |
| Example 15 | 90 | 0.22 | 90 | 0.23 |
| Comparative Example 18 | 95 | 0.23 | 55 | 0.45 |
| Example 16 | 88 | 0.24 | 87 | 0.22 |
| Example 17 | 80 | 0.25 | 78 | 0.23 |
| Example 18 | 60 | 0.25 | 60 | 0.25 |

INDUSTRIAL APPLICABILITY

As described above, according to the present invention, an article coated with a compact and strong silica film is obtained by applying an alcohol solution comprising a low concentration of a silicon alkoxide and a high concentration of a volatile acid on a substrate and drying it at normal temperatures. Furthermore, a functional coated article excellent in durability is obtained by treatment at normal temperatures by using this silica film as a primer film and applying on it an organosilane having a hydrolyzable group and a functional group having a specific function.

What is claimed is:

1. A method for producing a silica-based film-coated article comprising an application on a substrate, coating liquid composed of an alcohol solution containing;
   (A) silicon alkoxides having at least two alkoxide groups or hydrolyzates thereof (including a partial hydrolyzate), 0.010 to 3% by weight (in terms of silica),
   (B) an acid 0.0010 to 1.0 normality,
   (C) water 0 to 10% by weight, and
   (D) alcohol remaining.

2. A method for producing a silica-based film-coated article according to claim 1, wherein said coating liquid contains (A) at least one of either the silicon alkoxide or the hydrolyzate (including a partial hydrolyzate) and (B) an acid, in a proportion of [the component (B) (normality)/the component (A) (% by weight)] of 0.010 or more.

3. A method for producing a silica-based film-coated article according to claim 1, wherein said coating liquid contains the acid (B) and water (C) in an amount of [the component (B) (normality) X the component (C) (% by weight)] of 0.0020 or more.

4. A method for producing a silica-based film-coated article according to claim 1, wherein said coating liquid contains
   (A) silicon alkoxides having at least two alkoxide groups or hydrolyzates thereof (including a partial hydrolyzate), 0.010 to 0.6% by weight (in terms of silica),
   (B) an acid 0.0010 to 1.0 normality,
   (C) water 0 to 2% by weight, and
   (D) alcohol remaining.

5. A method for producing a silica-based film-coated article according to claim 1, wherein in said coating liquid, the acid in an amount of 0.3-fold or more of water content, and the silicon alkoxide are dissolved in alcohol.

6. A method for producing a silica-based film-coated article according to claim 1, wherein said component (A) is at least one of either tetramethoxysilane, tetraethoxysilane or a hydrolyzate thereof (including a partial hydrolyzate), and said component (B) is hydrochloric acid.

7. A method for producing a silica-based film-coated article according to claim 1, wherein said component (A) is substituted at a maximum amount of 30% by weight in terms of an oxide with a chelated compound of an alkoxide of a metal other than silicon in which β-diketone, acetic acid, trifluoroacetic acid or ethanolamine constitutes a ligand.

8. A method for producing a silica-based film-coated article according to claim 7, wherein the β-diketone of said ligand is acetylaceton.

9. A method for producing a silica-based film-coated article according to claim 7, wherein said metal alkoxide is an alkoxide of aluminum or zirconium.

10. A method for producing a silica-based film-coated article according to claim 1, wherein said coating liquid has a pH from 0 to 3.

11. A method for producing a silica-based film-coated article according to claim 1, wherein a film of said coating liquid applied on said substrate is dried at room temperature or at a temperature of 150° C. or less.

12. A method for producing a silica-based film-coated article according to claim 11, wherein said coating liquid is applied on the surface of said substrate so that said applied film manifests a thickness of 5 to 300 nm after drying.

13. A method for producing a silica-based film-coated article according to claim 1, wherein said substrate is a transparent glass sheet.

14. A silica-based film coated article having a static water drop contact angle of 20 to 40° obtained by the method according to claim 1.

15. A silica-based film coated article wherein the surface thereof has an arithmetical mean roughness of (Ra)=0.10 nm~0.5 nm and a ten points mean roughness (Rz)=1.0 nm~5.0 nm obtained by the method according to claim 1.

16. A method for producing a functional film coated article comprising further application of a composition for a functional film onto the surface of the silica-based film coated article obtained by the method according to claim 1.

17. A method for producing a functional film coated article according to claim 16 wherein said composition for a functional film contains at least one of an organosilane having a hydrolyzable functional group and a functional group having a specific function and a hydrolyzate thereof (including a partial hydrolyzate).

18. A method for producing a functional film coated article according to claim 17 wherein said hydrolyzable functional group is an alkoxyl group.

19. A method for producing a functional film coated article according to claim 16 wherein said composition for a functional film is a composition for forming a water-repellent film.

20. A method for producing a functional film coated article according to claim 19 wherein said composition for forming a water-repellent film contains at least one of either (A) an organosilane containing an alkoxyl group and a fluoroalkyl group in the molecule or (B) a hydrolyzate thereof (including a partial hydrolyzate).

21. A method for producing a functional film coated article according to claim 16 wherein said composition for a functional film is a composition for forming a film having a water-repellant performance and high abrasion resistance.

22. A method for producing a functional film coated article according to claim 21 wherein said composition for forming a film having a water-repellant performance and high abrasion resistance contains at least one of either (A) an organosilane containing an alkoxyl group and an alkyl group in the molecule or (B) a hydrolyzate thereof (including a partial hydrolyzate).

23. A method for producing a functional film coated article according to claim 16 wherein said composition for a functional film is a composition for forming a film which manifests excellent rolling property of a water drop and has pollution resistance.

24. A method for producing a functional film coated article according to claim 23 wherein said composition for forming a film which manifests excellent rolling property of a water drop and has pollution resistance contains at least one of either (A) an organosilane containing an alkoxyl group and a polyalkylene oxide group in the molecule or (B) a hydrolyzate thereof (including a partial hydrolyzate).

25. A functional film coated article obtained by a method according to claim 16.

26. A functional film coated article obtained by a method according to claim 16, wherein the surface of the film has an arithmetical mean roughness of (Ra)=0.10~0.5 nm and a ten points mean roughness of (Rz)=1.0 nm~5.0 nm.

27. A liquid composition for silica-based film coating comprising
   (A) silicon alkoxides having at least two alkoxide groups or hydrolyzates thereof (including a partial hydrolyzate), 0.010 to 3% by weight (in terms of silica)
   (B) an acid 0.0010 to 1.0 normality, and
   (C) water 0 to 10% weight
   (D) alcohol remaining.

* * * * *